Jan. 30, 1934.   A. GAZDA   1,945,431
HUMIDIFIER FOR CARBURETORS
Filed Oct. 23, 1931
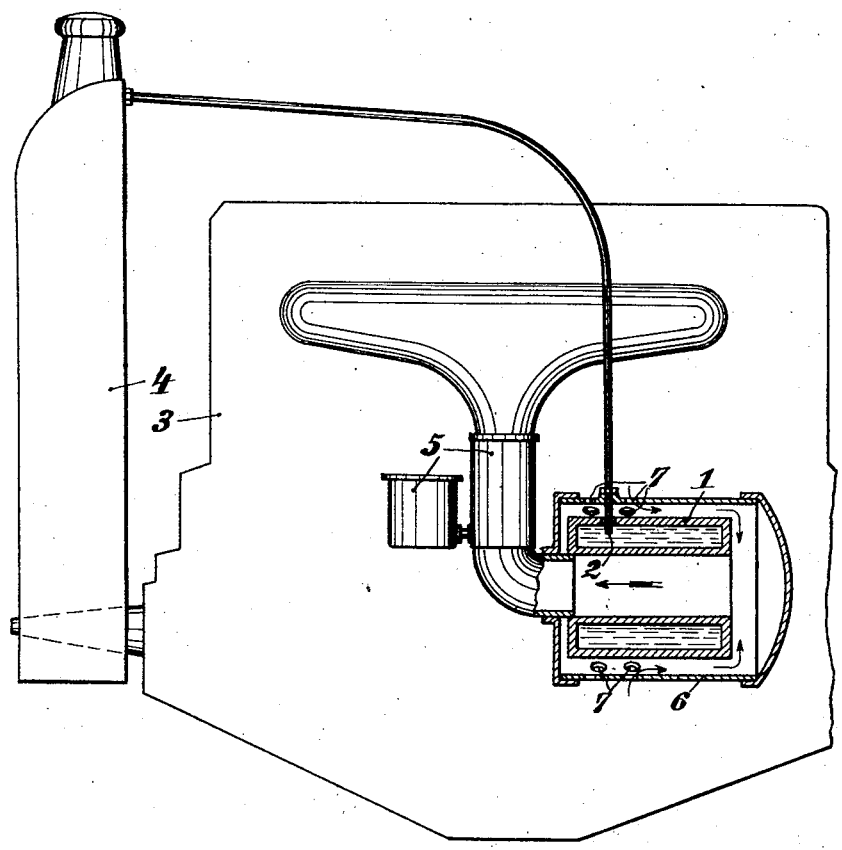

Patented Jan. 30, 1934

1,945,431

UNITED STATES PATENT OFFICE 1,945,431

HUMIDIFIER FOR CARBURETORS

Anton Gazda, Vienna, Austria

Application October 23, 1931, Serial No. 570,731, and in Austria October 25, 1930

1 Claim. (Cl. 261—95)

The known devices for moistening the suction air of internal combustion engines are provided with a porous pipe, which is filled with water and sucks-in the air, which is mixed with aqueous vapours or steam by contact with the damp inner surface of said tube. Damp surfaces of this kind easily retain the dust floating in the air and thus form very effective dust cleaners whenever the entire air is brought into contact with the same. Straight inner walls of the tube, as it is the case in the known air-moisteners, are not very effective, because the central portion of the air current, passing straight through the tube, does not contact with the wall. Also the area offered to the air is comparatively small with respect to the capacity of absorbing the moisture and the deposition of dust, e. g. the porous tube must be very long, which in many cases, particularly in the event of motor vehicles, renders difficult or impossible the arrangement of the device.

The present invention has for its object to improve the air-moisteners of this kind in that a hollow member consisting of porous material and filled with water is enclosed in a jacket and constructed in such a manner, that the air sucked-in successively contacts with the outer wall and the tubular inner wall of the porous hollow member.

Compared with the known devices of approximately like size, the device according to the above construction possesses the advantage that the area for the delivery of moisture and the reception of dust is more than doubled and at the same time all parts of the air intimately contact with the damp area owing to the repeated change in the direction of flow of the air, so that the efficiency of the device is considerably increased with respect to moistening the air and separating the dust therefrom.

One mode of carrying out the present invention is shown diagrammatically in the drawing.

The air-moistener comprises a hollow member 1 preferably of cylindric shape and constructed as water- or liquid receptacle. The latter is filled by way of the inlet 2, or in the case of a water-cooled motor 3 the liquid receptacle may be supplied with cooling water from the radiator 4. The liquid receptacle is arranged in front of or behind the carburetor 5 or in front of the suction opening of the engine. The mixture of air and gas sucked-in by the engine contacts with said receptacle during the suction stroke. The receptacle consists wholly or partly of a porous material or of another water-permeable material, which permits the evaporation of its liquid-contents. The suction strokes or air velocities depend on the different number of revolutions of the engine and the air, contacting with the porous water- or liquid receptacle, withdraws from the latter a greater or smaller quantity of water, this depending on the velocity of the air. The air is not sucked-in in the direction of suction but by way of a number of lateral slits 7 or like openings located at the outer face of the body portion 6 of the air-moistener. In view thereof the air is forced to contact at first with the outside of the water- or liquid receptacle and only thereafter the air comes into contact with the inner faces of said receptacle. In this way it is possible to separate the heavier ingredients such as dust, sand and so forth from the sucked-in air.

I claim:—

A humidifier for carburetors comprising a multi-walled tubular member with inner and outer walls of porous material adapted to hold a liquid between the inner and outer walls thereof, a body portion surrounding said member and providing an air channel between the latter and the wall of the body member, said multi-walled tubular member being hollow and the interior thereof communicating at one end with the air channel and at the other end with the air inlet of a carburetor, and an air inlet for said body member.

ANTON GAZDA.